Nov. 29, 1938.  J. M. CARTWRIGHT  2,138,726
GIRDLING TOOL
Filed June 3, 1937

JOHN M. CARTWRIGHT,
INVENTOR;
BY Francis C. Huebner,
ATTORNEY.

Patented Nov. 29, 1938

2,138,726

UNITED STATES PATENT OFFICE 2,138,726

GIRDLING TOOL

John M. Cartwright, Malaga, Calif.

Application June 3, 1937, Serial No. 146,151

1 Claim. (Cl. 30—173)

My invention relates to a girdling tool or girdling knife. In raising fruits and grapes it has become usual to girdle the cane or stalk producing the fruit, that is, to cut out a small band of the bark of the cane or stalk at a certain stage in the growth of the fruit, the object being to thereby increase the size of the fruit. I am aware that several forms of girdling tools, or knives are in use, but each and all of such tools assume that the cane or stalk to be girdled is truly round and the blades of the girdling tools and the knives cut unevenly in depth when the cane or stalk is some other shape than round, and should there be a depression in the periphery of the cane as is frequently the case, the bark is frequently not cut within such depression and the girdling is imperfectly done.

The object of my invention is the manufacture of a girdling tool having the blades shaped so that they will cut in depressions as well as in regular outlines as the tool and blade are moved around the cane, without regard to the contour of the periphery of the cane. Another object is the creation of a girdling tool which will readily discharge the cut out portions of the bark which would otherwise lodge between the blades. Another object is the creation of a tool which cannot easily get out of order and which can be cheaply constructed. Other objects will be hereinafter set forth.

I have accomplished these objects by means of the device hereinafter described, and illustrated on the accompanying drawing in which Fig. 1 is a perspective view of the girdling tool complete having a sectional view of a cane or arm of a grape vine in position to be girdled.

Figure 1:
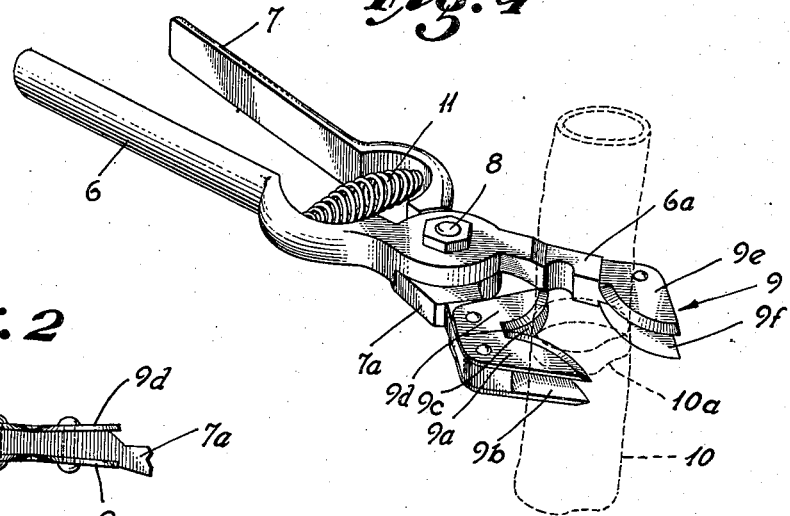
Figure 2:
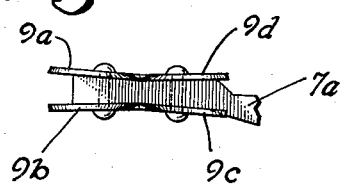
Fig. 2 is a plan view of the blades on one of the jaws showing the relative arrangement of four cutting blades thereon.

Referring to the drawing, I have shown handles 6 and 7 which are pivoted together with pivot 8. The movement of these handles on the pivot is preferably similar to the movement of the two elements of a pair of scissors or a pair of tongs, in which pressure on the handles close the jaws. Jaws 6a and 7a are extensions of handles 6 and 7 beyond the pivot 8. These jaws carry cutting blades 9.

Figure 3:
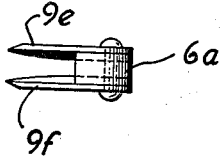
Fig. 3 is an end view of the jaw carrying two blades only.
Figure 4:
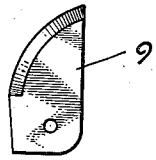
Fig. 4 is a unit cutting blade showing the face on which the blade is sharpened.
Figure 5:
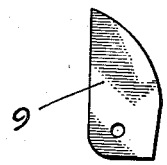
Fig. 5 shows a reverse face of the same blade shown in Fig. 4.

Cutting blade 9 is formed with a convex cutting edge, and is preferably sloped, or sharpened on one face only, the opposite face being a plane. These blades are assembled with the jaws as follows: The jaw shown as 7a has two blades on each side of the jaw, the blades 9a and 9d, and blades 9b and 9c being arranged so the sharpened edges of the blades on the one side of the jaw describe two segments of a circle, or curve joined at the end adjacent to the jaw to which it is attached, from which point of junction the sharpened edges of the blades curvingly diverge to a point. The blades are used in pairs. Each pair consists of two blades one on either side of the jaw, as shown in Fig. 3. The curves of the sharpened edges of each pair are approximately concentric. The pair of blades 9a and 9b should be positioned so their plane faces are adjacent to each other. The pair 9c and 9d, and pair 9e and 9f should likewise be positioned with their plane faces adjacent. In each pair the plane faces are not parallel, but slightly converge from the backs of the blades toward the sharpened edge. In view of the fact that the sharpened edges are convex, said sharpened edges of each pair diverge toward the points of the blades. The object of this arrangement of the blades is to assist automatically in cleaning the tool of strips of bark pealed from the canes girdled, which bark is deposited between the blades and which will clog the tool unless easily disposed of.

There are two blades, 9e and 9f on the jaw 6a. These blades compose a pair as they are positioned on opposite sides of the jaw. The approximate relation of the three pairs of blades when in use on a cane or arm of a vine is shown in Fig. 1 in which cane 10 is shown in section, it being noted that a portion of the cutting edge of each blade is in contact with the vine or cane. It is noted that as each of the blades has a convex cutting edge, the convex edge can enter any depressions on the vine, such as 10a, and cut the bark therein.

Spring 11 is adapted to normally hold the jaws and blades in an open relation. When in use sufficient pressure must be placed on the handles to overcome the spring tension and to hold the blades adjacent to the cane being girdled.

It is also noted that my girdling tool has three double-point contacts of the cutting edges with the cane or vine, which gives the user the advantage of less movement in circling the cane than would be required if the tool had two double-point contacts, or a one double-point contact common with the tools now in use.

Having described my invention I claim as new and ask for Letters Patent:

A girdling tool having two handles, each handle terminating at one end with a jaw, said handles being pivotally connected, adapting the jaws to be opened and closed, cutting blades convex in shape, each blade terminating at an approximate point, said blades being arranged on the jaws in pairs, the blades forming each pair being positioned on diverging planes, the greatest divergence between the blades of each pair being at the points of the blades, two pairs of blades being attached to one jaw, the two pairs of blades thereon being arranged so that the sharpened edges of one pair diverge from the sharpened edges of the other pair, the cooperating jaw having one pair of blades thereon, the one pair of blades on said cooperating jaw being positioned so that the sharpened edges thereof are on the same approximate plane as the cooperating blades on the jaw having two pairs of blades thereon.

JOHN M. CARTWRIGHT.